(12) United States Patent
Serrano et al.

(10) Patent No.: US 7,911,892 B2
(45) Date of Patent: *Mar. 22, 2011

(54) CENTER ERROR MECHANICAL CENTER ADJUSTMENT

(75) Inventors: Louis J. Serrano, Los Gatos, CA (US); Xiao Lin, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,469

(22) Filed: Jul. 21, 2009

(65) Prior Publication Data
US 2009/0279397 A1    Nov. 12, 2009

Related U.S. Application Data

(63) Continuation of application No. 11/257,606, filed on Oct. 25, 2005, now Pat. No. 7,580,331.

(51) Int. Cl.
*G11B 7/00* (2006.01)
(52) U.S. Cl. ............... 369/44.29; 369/44.28; 369/44.11
(58) Field of Classification Search .................. None
See application file for complete search history.

(56) References Cited

U.S. PATENT DOCUMENTS

| 4,956,833 | A | 9/1990 | Kokado et al. | 369/44.41 |
| 5,920,528 | A | 7/1999 | Ohshima et al. | 369/44.29 |
| 6,549,492 | B1 | 4/2003 | Song | 369/44.29 |
| 7,580,331 | B2 * | 8/2009 | Serrano et al. | 369/44.29 |
| 2001/0020674 | A1 | 9/2001 | Youn | 250/216 |
| 2002/0021632 | A1 * | 2/2002 | Park | 369/44.28 |
| 2003/0099170 | A1 | 5/2003 | Cheng | 369/44.29 |
| 2004/0136282 | A1 | 7/2004 | Chen | 369/44.35 |
| 2004/0257929 | A1 * | 12/2004 | Suzuki | 369/44.28 |

* cited by examiner

*Primary Examiner* — Lixi Chow
(74) *Attorney, Agent, or Firm* — Christopher P. Maiorana, PC

(57) ABSTRACT

An apparatus comprising a center error creation circuit and a center error offset injection circuit. The center error creation circuit may be configured to generate a center error signal in response to light from a main laser reflected from a surface of an optical disc. The center error offset injection circuit may be configured to (i) determine a value of the center error signal when a lens in a sled housing is at a mechanical center and (ii) generate an offset signal based upon the value. The center error offset injection circuit generally measures an average value of the center error signal over a predetermined amount of time when a lens suspension which holds the lens in place is in a mechanical equilibrium state.

20 Claims, 7 Drawing Sheets

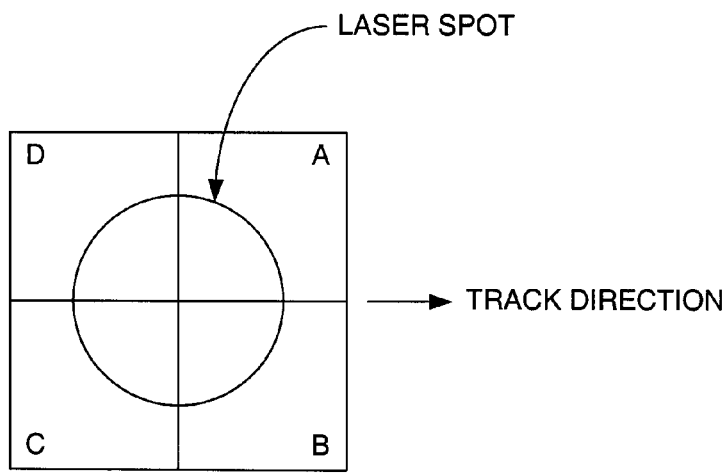
FIG. 1
(CONVENTIONAL)
| | TRACK FOLLOW | FINE SEEK | ROUGH SEEK |
|---|---|---|---|
| LENS | TRACK FOLLOW ESTIMATOR (TE) | FINE SEEK ESTIMATOR (TE) | CE LENS CONTROLLER (CE) |
| SLED | CE TRACKING MONITOR (CE) | FEED FORWARD (TX COUNTER) | ROUGH SEEK SPEED PROFILE |
FIG. 4

CENTER ERROR MECHANICAL CENTER ADJUSTMENT

This is a continuation of U.S. Ser. No. 11/257,606, filed Oct. 25, 2005 now U.S. Pat. No. 7,580,331, which is incorporated by reference.

FIELD OF THE INVENTION

The present invention relates to optical storage generally and, more particularly, to a method and/or apparatus for implementing a center error mechanical center adjustment.

BACKGROUND OF THE INVENTION

In a conventional optical disc system, to sense the position of the laser beam in relation to the track on the disc, the main laser beam creates a reflection from the disc. The reflection is typically picked up by 4 photo-diode sensors (or a photo detector array). FIG. 1 is a conceptual diagram illustrating how such a photo-diode configuration is laid out in relation to the track direction. The outputs of the 4 photo-diodes (when the laser beam is focused on the disc) are shown as signals A, B, C and D, respectively.

A track position (e.g., the location of a laser spot relative to a track center on an optical disc) is detected by imaging the laser spot on the photo detector array. Diffraction causes a slight change in intensity on the two different sides of the photo detector array when the relative position of the laser spot and center of the track changes. The difference in intensity on the two different sides of the photo detector array is called a push-pull signal. The push-pull signal is proportional to the tracking error signal or signal TE.

If the laser does not shine directly through a center of the lens, an image is moved to one side and the push-pull signal changes. Such an effect is defined as the center error (CE). The center error cannot be distinguished from the push-pull effect by examining one laser spot alone. To obtain an accurate track position, a second measurement is taken one-half track away from where the first measurement was taken. With the second measurement, the center error is common to the first measurement, but the push-pull effect is reversed. By combining the first and the second measurements, an accurate track position can be determined. For DVD ROMs, a phase detection method is used to detect the track position. The phase detection method is mostly immune to the effect of center error.

In an optical pick-up unit (OPU), the lens is held in position by springs in a sled housing. The optical center of the lens in the OPU is defined as the position of the lens where the center error is zero (i.e., where the laser is shining through the center of the lens). However, the position of the lens where the center error is zero, may not be the natural position of the lens when both springs are in a mechanical equilibrium state (e.g., when no control force is being applied). The natural position of the lens is defined as a mechanical center. Therefore, the center error is not necessarily zero when (i) the lens is at the mechanical center or (ii) the output of a lens controller is zero.

The motion of the laser spot is a superposition of the motion of the sled plus the motion of the lens inside the sled housing. A track seek initiated by the motion of the lens is called a fine seek (or fine seek mode for the system). The fine seek mode is slow because the laser spot remains locked to the disc even while the laser spot is crossing the tracks. The lens may move over several hundred tracks under the fine seek mode. However, if a target track is displaced at a large distance from where the laser spot is currently positioned, the lens cannot move fast enough under the fine seek mode. Therefore, the sled motor is used to reposition the lens under such a condition. A rough seek mode includes moving the lens and the sled housing with a sled motor to move the lens to the target track. While in the rough seek mode, the laser spot is unlocked from the disc. The signal CE is used to control or position the lens to the center of the housing. Positioning the lens to the center of the housing prevents the lens from inadvertently hitting the housing when the sled motor accelerates or decelerates in the rough seek mode. Such an impact can cause the lens to loose focus.

When it is necessary to lock the laser spot back on the tracks, a CE controller will switch to a tracking controller (or tracking error (TE) controller) which servos on a tracking error signal. When it is necessary to lock the laser spot back on the tracks, the center error signal will no longer be used to control the lens. Any previous control output to keep the lens at the optical center and not on the mechanical center will be lost when the control of the lens is switched from CE controller to the TE controller. The change in control from the CE controller to the TE controller will introduce a transient effect that affects the lock-on-track performance at the end of the rough seek mode. Conventional methods are characterized by an increase in seek time. The seek time includes the time for the lens-to-disc motion (which may be induced by switching from the center error signal to the mechanical center) to dissipate.

SUMMARY OF THE INVENTION

The present invention concerns an apparatus comprising a center error creation circuit and a center error offset injection circuit. The center error creation circuit may be configured to generate a center error signal in response to light from a main laser reflected from a surface of an optical disc. The center error offset injection circuit may be configured to (i) determine a value of the center error signal when a lens in a sled housing is at a mechanical center and (ii) generate an offset signal based upon the value. The center error offset injection circuit generally measures an average value of the center error signal over a predetermined amount of time when a lens suspension which holds the lens in place is in a mechanical equilibrium state.

The objects, features and advantages of the present invention include providing a method and/or apparatus for implementing a CE mechanical center adjustment that may (i) minimize the change in the output of a lens control output when the CE controller is switched to the track controller at the end of the rough seek mode (ii) allow the laser to lock to a track reliably, and/or (iii) improve the seek performance of the optical drive.

BRIEF DESCRIPTION OF THE DRAWINGS

These and other objects, features and advantages of the present invention will be apparent from the following detailed description and the appended claims and drawings in which:

FIG. 1 illustrates a photo-diode sensor distribution system;

FIG. 4 is a diagram illustrating tracking modes associated with the type of controller used;

DETAILED DESCRIPTION OF THE PREFERRED EMBODIMENTS

Figure 2:
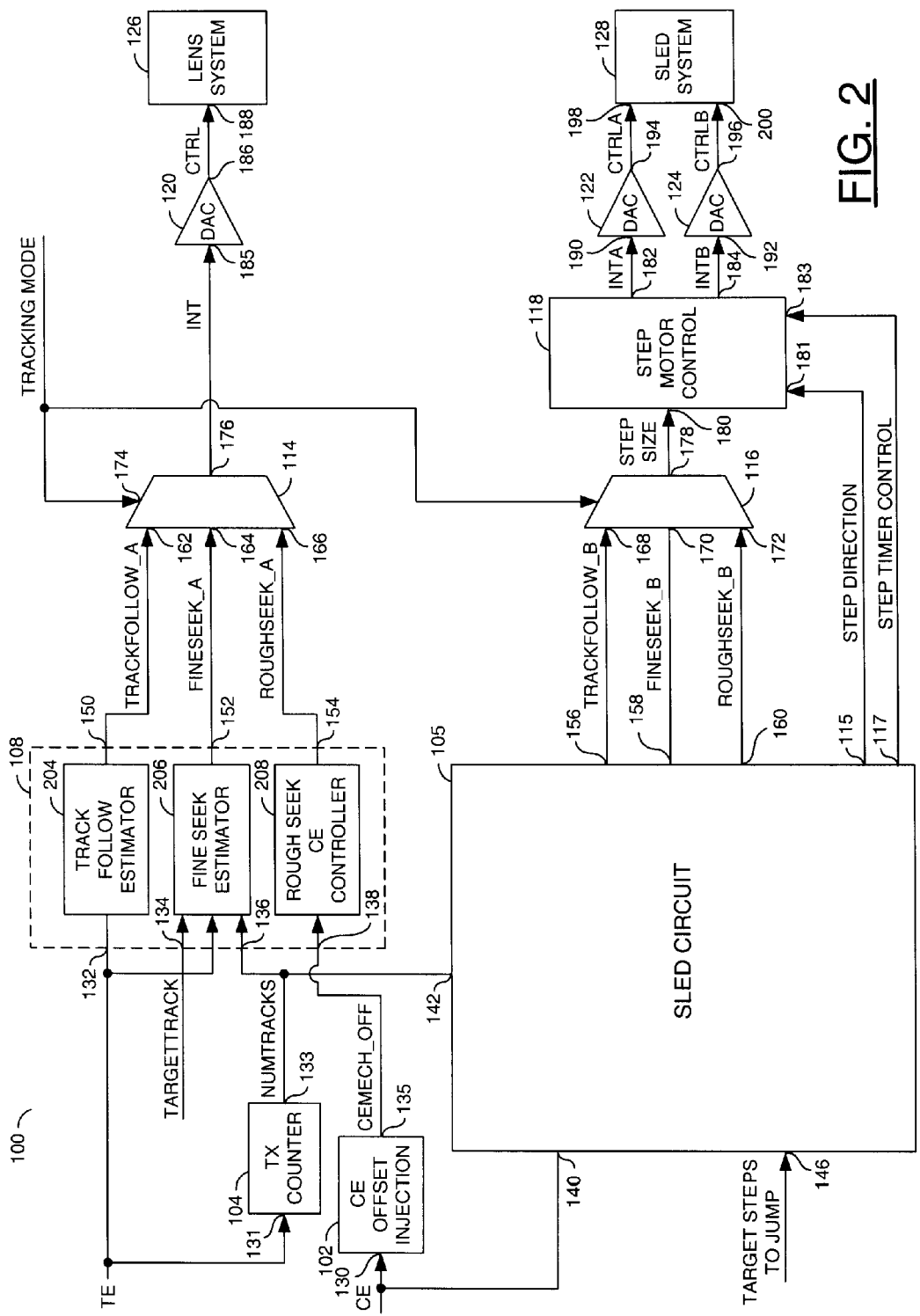
FIG. 2 is a diagram illustrating a present embodiment of the present invention.

Referring to FIG. 2 a diagram of a system 100 in accordance with the present invention is shown. The system 100 generally comprises a block (or circuit) 102, a block (or circuit) 104, a block (or circuit) 105, a block (or circuit) 108, a block (or circuit) 114, a block (or circuit) 116, a block (or circuit) 118, a block (or circuit) 120, a block (or circuit) 122, a block (or circuit) 124, a block (or circuit) 126 and a block (or circuit) 128. The circuit 102 may be implemented as a CE offset injection circuit. The circuit 104 may be implemented as a track counter. The circuit 105 may be implemented as a sled circuit. The circuit 108 may be implemented as a lens controller. The circuit 114 may be implemented as a multiplexer. The circuit 116 may be implemented as a multiplexer. The circuit 118 may be implemented as a step motor control circuit. The circuit 120 may be implemented as a digital-to-analog converter. The circuit 122 may be implemented as a digital-to-analog converter. The circuit 124 may be implemented as a digital to analog converter. The circuit 128 may be implemented as a step sled system 128.

The CE offset injection circuit 102 may have an input 130 that may receive the signal CE and an output 135 that may present a signal (e.g., CEMECH_OFF). The track counter 104 may have an input 131 that may receive the signal TE and an output 133 that may present a signal (e.g., NUMTRACKS). The sled circuit 105 may have an input 140 that may receive the signal CE, an input 142 that may receive the signal (e.g., NUMTRACKS), and an input 146 that may receive a signal (e.g., TARGETSTEPSTOJUMP). The sled circuit 105 may have an output 115 that may present a signal (e.g., STEPDIRECTION), an output 117 that may present a signal (e.g., STEPTIMERCONTROL), an output 156 that may present a signal (e.g., TRACKFOLLOW_B), an output 158 that may present a signal (e.g., FINESEEK_B), and an output 160 that may present a signal (e.g., ROUGHSEEK_B). The lens controller 108 may have an input 132 that may receive the signal TE, an input 134 that may receive a signal (e.g., TARGETTRACK), an input 136 that may receive the signal NUMTRACKS, and an input 138 that may receive the signal CEMECH_OFF. The lens controller 108 may have an output 150 that may present a signal (e.g., TRACKFOLLOW_A), an output 152 that may present a signal (e.g., FINESEEK_A) and an output 154 that may present a signal (e.g., ROUGHSEEK_A).

The multiplexer 114 may have an input 162 that may receive the signal TRACKFOLLOW_A, an input 164 that may receive the signal FINESEEK_A, an input 166 that may receive the signal ROUGHSEEK_A and an input 174 that may receive a signal (e.g., TRACKINGMODE). The multiplexer 114 may have an output 176 that may present any one of the signals TRACKFOLLOW_A, FINESEEK_A or ROUGHSEEK_A on a signal (e.g., INT).

The multiplexer 116 may have an input 168 that may receive the signal TRACKFOLLOW_B, an input 170 that may receive the signal FINESEEK_B, and an input 172 that may receive the signal ROUGHSEEK_B. The multiplexer 116 may have an output 178 that may present a signal (e.g., STEPSIZE). The step motor control circuit 118 may have an input 180 that may receive the signal STEPSIZE, an input 181 that may receive a signal (e.g., STEPDIRECTION), and an input 183 that may receive a signal (e.g., STEPTIMERCONTROL). The step motor control circuit 118 may have an output 182 that may present a signal (e.g., INTA) and an output 184 that may present a signal (e.g., INTB).

The digital-to-analog controller 120 may have an input 185 that may receive the signal INT and an output 186 that may present a signal (e.g., CTRL). The lens system 126 may have an input 188 that receives the signal CTRL. The digital-to-analog converter 122 may have an input 190 that may receive the signal INTA and an output 194 that may present a signal (e.g., CTRLA). The digital-to-analog converter 124 may have an input 192 that may receive the signal INTB and an output 196 that may present a signal (e.g., CTRLB). The step sled system 128 may have an input 198 that may receive the signal CTRLA and an input 200 that may receive the signal CTRLB. The lens controller 108 may control a lens (not shown) in the lens system 126 based on the mode of the system 100. The lens controller 108 may control the lens in response to the signal TE or the signal CEMECH_OFF based on the mode of the system 100. The sled circuit 105 may control a sled motor (not shown) in the step sled system 128 in response to the signals CE, TE or STEPSIZE based on the mode of the system 100.

Figure 3:
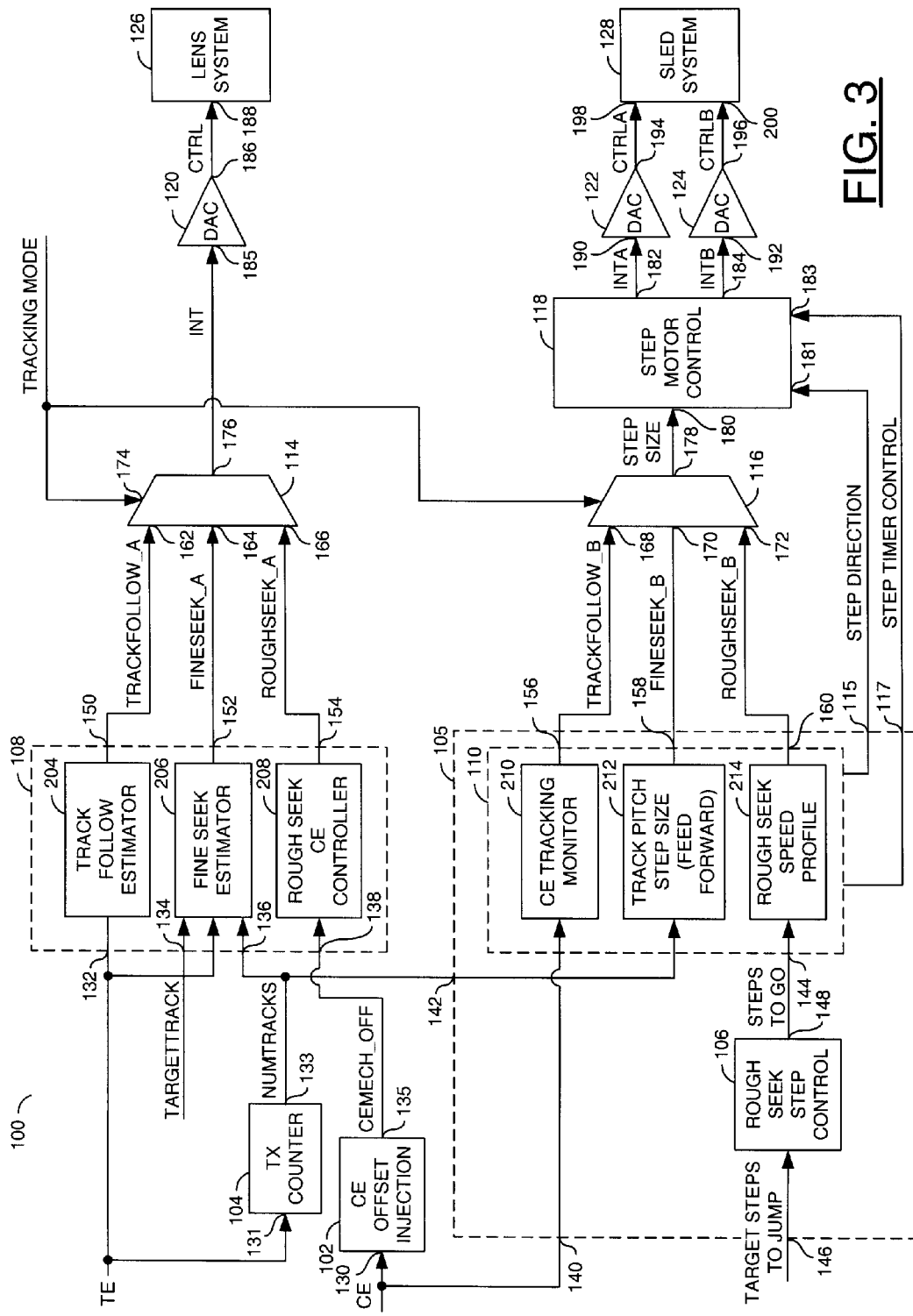
FIG. 3 is a detailed diagram illustrating the present embodiment of the present invention.

Referring to FIGS. 3-4, a detailed diagram of the system 100 is shown. The lens controller 108 generally comprises a block (or circuit) 204, a block (or circuit) 206, and a block (or circuit) 208. The circuit 204 may be implemented as a track follow estimator. The circuit 206 may be implemented as a fine seek estimator. The circuit 208 may be implemented as a CE controller. The lens controller 108 may control the lens system 126 based on whether the system 100 is in the track follow mode, the fine seek mode, or the rough seek mode. The track follow estimator 204 and the fine seek estimator 206 may be implemented as a track controller. The sled circuit 105 generally comprises a block (or circuit) 106 and a block (or circuit) 110. The circuit 106 may be implemented as a rough seek step control circuit. The circuit 110 may be implemented as a sled controller. The sled controller 110 generally comprises a block (or circuit) 210, a block (or circuit) 212 and a block (or circuit) 214. The circuit 210 may be implemented as a CE tracking monitor. The circuit 212 may be implemented as a feed forward circuit. The circuit 214 may be implemented as a rough seek speed profile circuit. The sled controller 110 may have an input 144 that may receive a signal (e.g., STEPSTOGO). The sled controller 110 may control the step motor control circuit 118 based on whether the system 100 is in the track follow mode, the fine seek mode or the rough seek mode. The step motor control circuit 118 may drive a step motor (not shown) in the step sled system 128. The step motor may drive the sled housing (not shown) in the step sled system 128.

The signal STEPDIRECTION may provide the direction of travel for a step motor. The signal STEPTIMERCONTROL may provide the time and/or frequency between two adjacent step motor steppings. The signal TARGETSTEPSTOJUMP may provide the number of steppings needed for the step direction of the sled motor. The signal STEPTIMERCONTROLER may provide the stepping frequency of the step motor. When the system 100 is in the tracking mode. the CE tracking monitor 210 may generate the control signals STEPSIZE, STEPDIRECTION, and STEPTIMERCONTROL in response to the signal CE. When the system 100 is in the fine seek mode, the feed forward control circuit 212 may generate the control signals STEPSIZE, STEPDIRECTION, and STEPTIMERCONTROL by monitoring the number of tracks crossed on the signal NUMTRACKS. When the system 100 is in the rough seek mode, the speed profile circuit 214 may generate the control signals STEPSIZE, STEPDIRECTION, and STEPTIMERCONTROL based on the number of tracks left to go on the signal STEPSTOGO.

The track follow estimator 204 may position the lens on a center of the track when the system 100 is in a track follow mode. The track counter 104 may (i) count the zero crossings of the signal TE and (ii) provide the number of tracks that the lens has crossed on the signal NUMTRACKS. The fine seek estimator 206 may move the lens a predetermined number of tracks under a specified direction when the system 100 is in the fine seek mode. The CE offset injection circuit 102 generally provides the amount of offset in the signal CE needed to keep the lens centered around the mechanical center. The CE controller 208 may position the lens in the center of a sled housing during sled motion when the system 100 is in the rough seek mode in response to the signal CEMECH_OFF. The CE controller 208 may position the lens to the mechanical center with the signal CEMECH_OFF at any time when the system 100 is in the rough seek mode. The signals TRACKFOLLOW_A, FINESEEK_A, AND ROUGHSEEK_A may be digital control signals presented by the multiplexer 114. The digital-to-analog converter 120 may convert the any one of the signals TRACKFOLLOW_A, FINESEEK_A, or ROUGHSEEK_A to an analog control signal on the signal CTRL to drive the lens system 126.

The CE tracking monitor 210 may keep the lens at the center of the housing by monitoring the signal CE when the system 100 is in the track follow mode. The feed forward circuit 212 may calculate the corresponding step motor steps (or steppings) needed to move the sled motor to ensure that the lens will stay at the center of the sled housing in the fine seek mode. The feed forward circuit 212 may use the number of tracks that the lens has crossed to calculate the corresponding step motor steps when the system 100 is in the fine seek mode. The rough seek step control 106 generates a rough seek speed profile on the signal STEPSTOGO when the system 100 is in a rough seek mode. The rough seek speed profile 214 may determine each individual steppings the step motor needs to perform based on a certain step size, direction and frequency. The step motor control circuit 118 may receive any one of the signals TRACKFOLLOW_B, FINESEEK_B or ROUGHSEEK_B depending on the mode of the system 100. The signals TRACKFOLLOW_B, FINESEEK_B AND ROUGHSEEK_B may be digital data presented by the multiplexer 116. The signal presented by the multiplexer 116 may be determined by the signal TRACKING_MODE which indicates the mode of the system 100. The step motor controller circuit 118 may present digital data on the signals INTA and INTB. The digital-to-analog converter 122 may convert the digital data on the signal INTA to the analog control signal CTRLA. The digital-to-analog converter 124 may convert the digital data on the signal INT_B to the analog control signal INT_B. The control signals CTRLA and CTRLB may be used to control the step motor of the step sled system 128.

Figure 5:
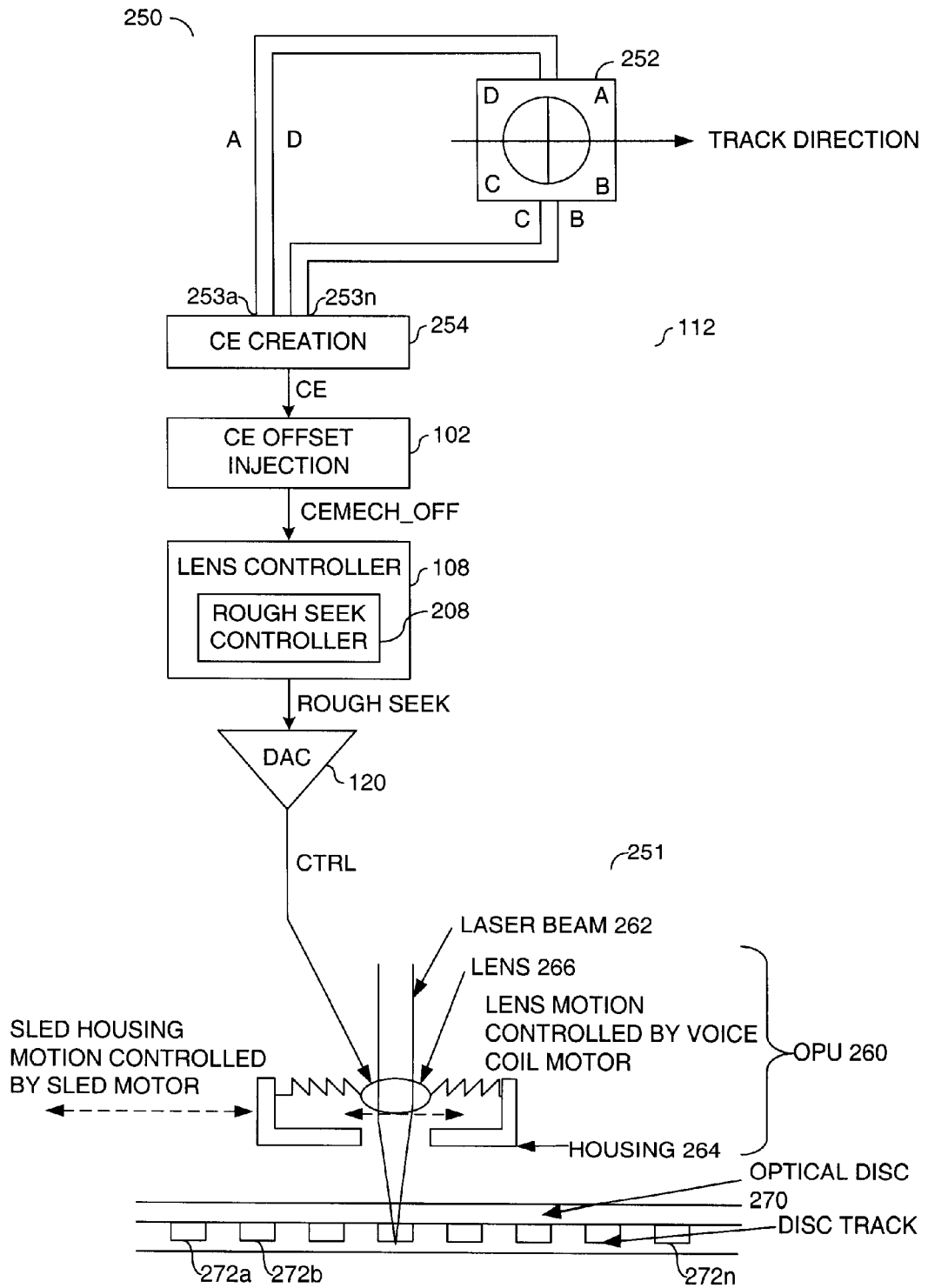
FIG. 5 is a diagram illustrating the present invention in a rough seek mode.

Referring to FIG. 5, a detailed diagram of a system 250 in a rough seek mode is shown. The system 250 generally comprises the CE offset injection circuit 102, the lens controller 108, the digital-to-analog converter 120, a photo-diode distribution portion 252, a CE creation circuit 254, and a lens housing assembly 251. The lens housing assembly 251 generally comprises an optical disc 260, a laser 262, a sled housing 264, a lens 266, and an optical disc 270.

The photo-diode system 252 generally has output signals (or photo-diode signals) A, B, C and D that are generally presented to a number of inputs 253a-253n of the CE creation circuit 254. The CE creation circuit 254 may generate the signal CE. When the system 250 is in the rough seek mode, the signal CE may be used instead of the signal TE to control the lens 266. The CE offset injection circuit 102 may offset the signal CE to position the lens 266 at the mechanical center in the sled housing 264 while the system 250 is in the rough seek mode. The CE offset injection circuit 102 may determine the amount of offset needed to position the lens 266 at the mechanical center during a tracking open-loop calibration. When no control is exerted on the lens 266, the CE offset injection circuit 102 measures the average value of the signal CE of the lens 266 over a period of time. The average value of the signal CE value of the lens 262 at an equilibrium position (e.g., when both springs are in a mechanical equilibrium state) may be defined as the mechanical center of the lens 266. The optical center of the lens 266 be defined as the position of the lens 266 when the signal CE is zero (e.g., when the laser 262 shines through the center of the lens 266 the signal CE may be zero). However, when the lens 266 is at the mechanical center, the signal CE may not necessarily be at zero.

During the rough seek mode, the lens 266 and the laser beam 262 may not be locked to any one of the particular disc tracks 272a-272n and the sled housing 264 is repositioned by the sled motor. As noted in connection with FIG. 5, the rough seek speed profile circuit 214 and the step motor control circuit 118 may reposition the step sled system 128 when in the rough seek mode. The CE controller 208 may position the lens 266 near the center of the sled housing 264 to prevent the lens 266 from hitting the sled housing 264 when the sled housing accelerates or decelerates. The CE controller 208 may also keep the lens 266 at the mechanical center. At the end of the rough seek mode, the track controller (e.g., or the track follow estimator 204 and the fine seek estimator 206 depending on the mode of the system 100) may lock the laser beam 262 to any one of the particular disc tracks 272a-272n with the signal TE. The lens 266 may be naturally biased in the mechanical center prior to switching control from the signal CE (e.g., via the CE controller 208) to the signal TE (e.g., to the track controller). The lens 266 may be positioned at the mechanical center at any time of the rough seek mode. Both approaches minimize the sudden jump in control while locking the laser beam 262 through the lens 266 onto any one of the particular tracks 272a-272n.

Figure 6:
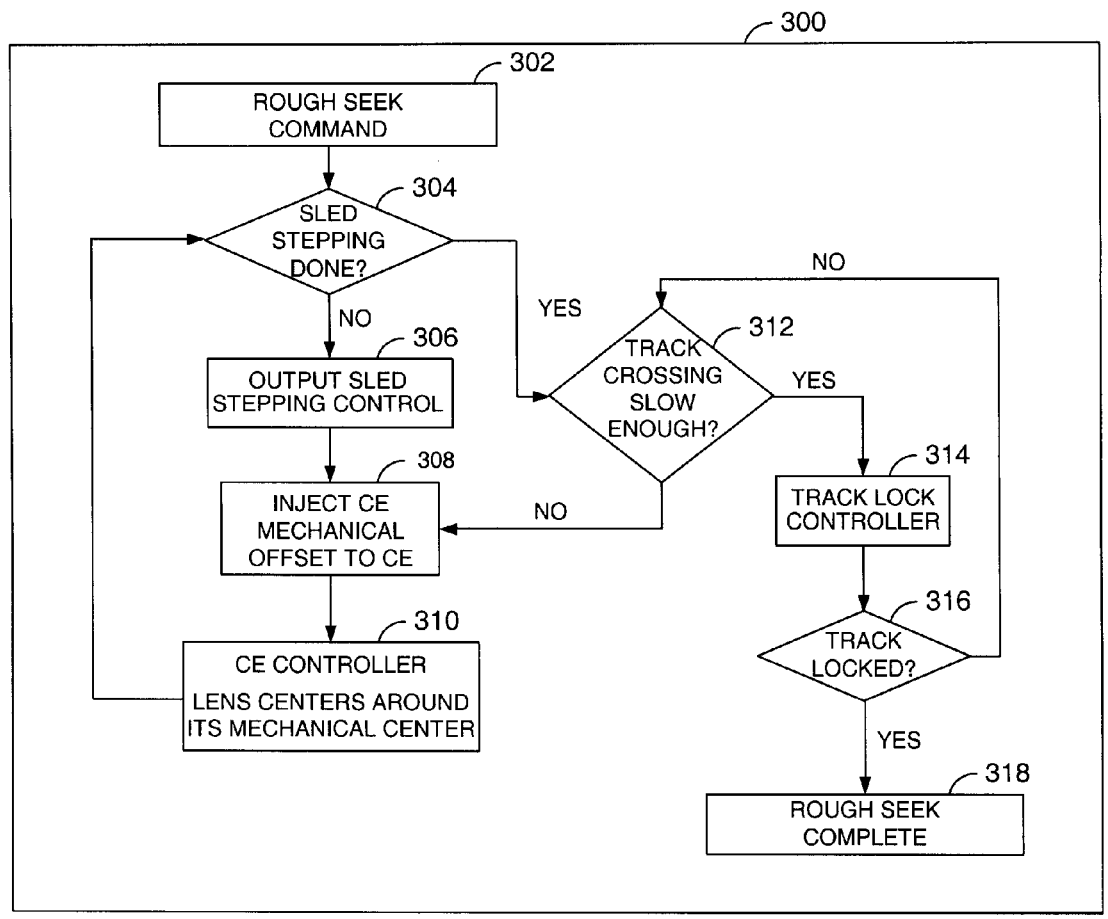
FIG. 6 is a flow diagram illustrating a process of the present embodiment.

Referring to FIG. 6, a method 300 for the servo rough seek command showing when the CE mechanical offset is injected during a rough seek is shown. The method 300 generally comprises a state (or step) 302, a decision state (or step) 304, a state (or step) 306, a state (or step) 308, a state (or step) 310, a decision state (or step) 312, a state (or step) 314, a decision state (or step) 316, and a state (or step) 318. The state 302 issues a rough seek command. The system 100 may exit out of the track follow mode or the fine seek mode and enter into the rough seek mode when it is necessary to reposition the sled housing 264 and the lens 266 with the sled motion. The decision state 304 may determine whether the sled motor has completed stepping in response to the system 100 entering into the rough seek mode. If the decision state 304 determines that the stepping of the sled motor has not completed, or that the sled housing 264 has not reached the target sled position, the method 300 moves to step 306. The state 306 may continue to present a step motor control signal to move the sled housing 264. The state 308 may generate the CE mechanical offset necessary to keep the lens 266 at a mechanical center while the sled housing 264 is being repositioned to the target sled position. The state 310 may center the lens 266 around the mechanical center with the CE controller 208, then move to the decision state 304.

If the decision state 304 determines that the sled stepping is complete and that the sled housing 264 has reached the target position, the method 300 moves to the decision state 312. The decision state 312 may determine whether the track crossing is slow enough. If the decision state 312 determines that the track crossing is not slow enough, the method 300 moves to the state 308. In the decision state 312, the lens 266 and the laser 262 may not be locked to the disc 270. The decision state 312 may determine when the movement of the lens 266 relative to the disc 270 is slow enough. If the decision state 312 determines that the track crossing is slow enough (or that the movement of the lens 266 relative to the disc 270 is slow enough), the method 300 moves to the state 314. The state 314 attempts to lock the lens to the target track with the track controller. The decision state 316 determines if the target track is locked. If the target track is not locked, the method 300 moves to the decision state 312. If the target track is locked, the method 300 moves to the state 318 and the rough seek mode is complete.

Figure 7:
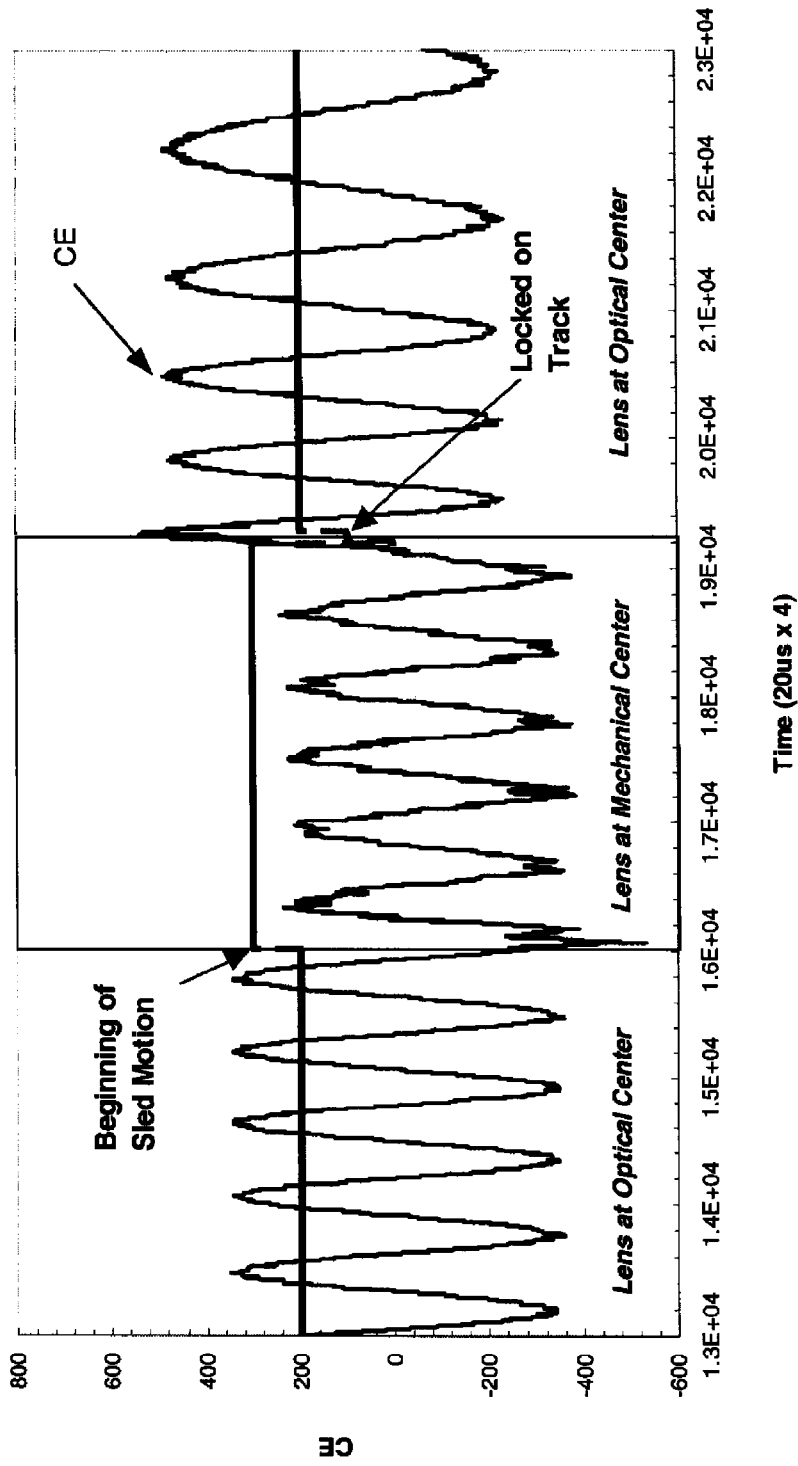
FIG. 7 is a diagram illustrating a CE waveform which implements the present invention.

Referring to FIG. 7, a diagram illustrating the CE with a mechanical offset adjustment is shown. FIG. 7 illustrates a rough seek CE waveform (or the signal CE with the mechanical offset) with the lens 266 kept around the mechanical center during the sled motion while in the rough seek mode. At the end of the rough seek mode, the track controller is initialized to lock on the tracks 272a-272n using the signal TE. The CE waveform fails to show a transient when the control of the lens 266 is switched from the CE controller 208 to the track controller.

Figure 8:
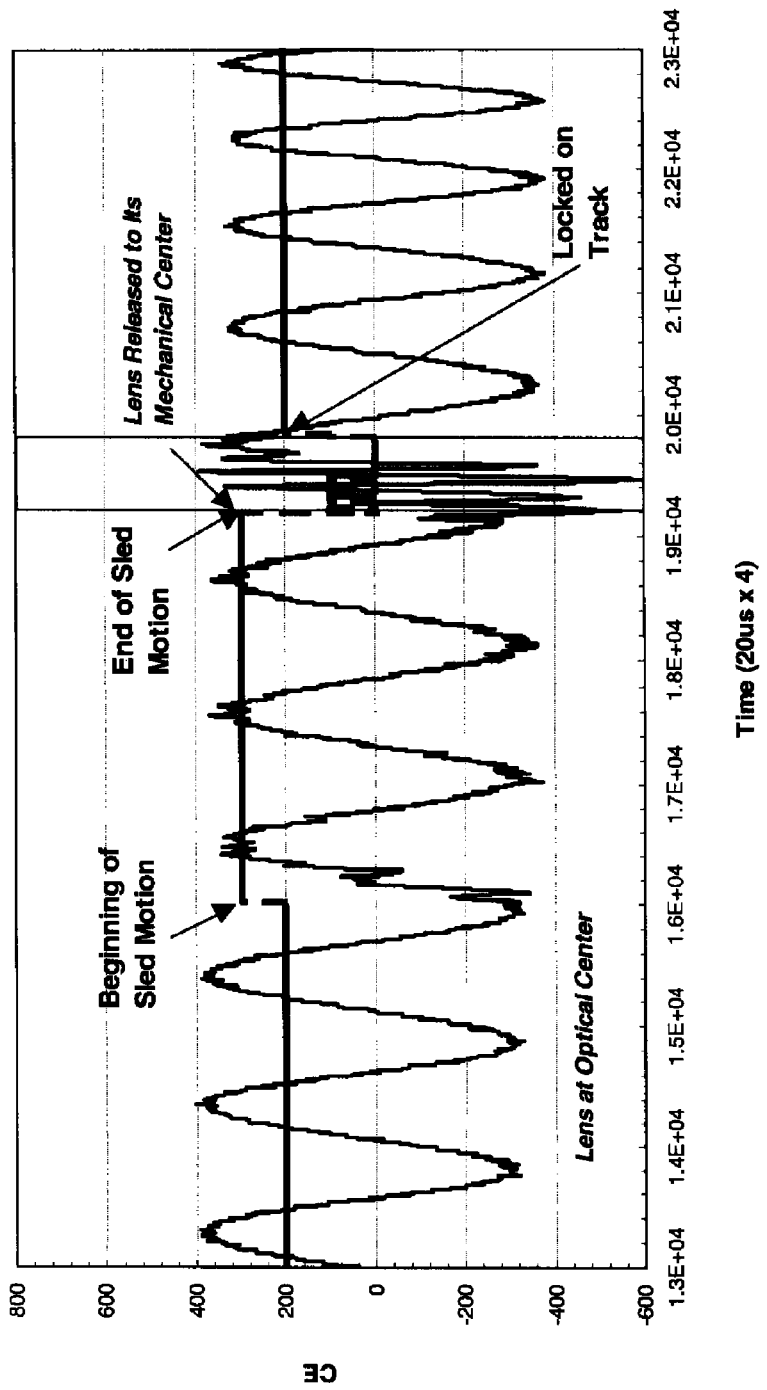
FIG. 8 is a diagram illustrating a CE waveform without the CE mechanical offset injection.

Referring to FIG. 8, a diagram illustrating a CE waveform without a mechanical offset adjustment is shown. At the end of the rough seek mode, the track controller may be initialized to lock on a particular one of the tracks 272a-272n tracks using the tracking error while the lens 266 is naturally biased around the mechanical center of the lens 266. Such a transient effect as illustrated in FIG. 8 is due to the difference between the optical and mechanical centers of the lens 266. The difference between the optical and mechanical centers of the lens 266 increases the difficulty and the lock time needed to lock the laser beam 262 on a particular one of the tracks 272a-272n. The difference between the optical and mechanical centers of the lens 266 may reduce reliability when the system 100 is in the rough seek mode.

The present invention may inject a CE mechanical offset during the entire course of a rough seek to reduce the transient effect while locking the laser 262 to any one of the particular number of tracks 272a-272n. The present invention may minimize the change in the signal CE control output between the CE controller 208 and the track controller. The present invention may (i) allow the laser 120 to lock on any one of the particular number of tracks 272a-272n reliably and (ii) improve the seek performance of the optical drive. The present invention may be applied to any application that involves the switching of control input signals between different modes to minimize transient effect.

The function performed by the flow diagram of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing information.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a center error creation circuit configured to generate a center error signal in response to light from a main laser reflected from a surface of an optical disc;
   a center error offset injection circuit configured to (i) determine a value of said center error signal when a lens in a sled housing is at a mechanical center and (ii) generate an offset signal based upon said value, wherein said center error offset injection circuit measures an average value of said center error signal over a predetermined amount of time when a lens suspension which holds said lens in place is in a mechanical equilibrium state.

2. The apparatus according to claim 1, wherein said center error offset injection circuit is configured to determine an amount of offset needed to keep said lens at said mechanical center during a tracking open-loop calibration operation.

3. The apparatus according to claim 1, further comprising:
   a center error controller configured to adjust said lens in said sled housing at said mechanical center in response to said offset signal when said apparatus is in a rough seek mode.

4. The apparatus according to claim 1, wherein said lens suspension comprises one or more springs.

5. The apparatus according to claim 1, further comprising one or more photo-diode sensors configured to generate one or more photo-diode signals in response to the reflected light from said surface of said optical disc, wherein said center error signal is generated in response to said one or more photo diode signals.

6. The apparatus according to claim 1, wherein said apparatus further comprises:
   a sled controller configured to move said sled housing over a predetermined number of tracks during a rough seek mode.

7. The apparatus according to claim 1, further comprising:
   a track controller configured to lock a laser with said lens onto one or more tracks with a tracking error signal when said apparatus is in one of a track follow mode and a fine seek mode.

8. The apparatus according to claim 7, wherein said lens is positioned at said mechanical center when said track controller locks said laser with said lens on said tracks.

9. An apparatus comprising:
   means for generating a center error signal in response to light from a main laser reflected from a surface of an optical disc;
   means for (i) determining a value of said center error signal when a lens in a sled housing is at a mechanical center and (ii) generating an offset signal based upon said value, wherein said determining and generating means measures an average value of said center error signal over a predetermined amount of time when a means for holding said lens in place is in a mechanical equilibrium state.

10. The apparatus according to claim 9, further comprising:
   means for adjusting said lens in said sled housing at said mechanical center in response to said offset signal when said apparatus is in a rough seek mode.

11. A method for adjusting a lens in a sled housing of an optical disc system, comprising the steps of:
   (A) generating a center error signal in response to light from a main laser reflected from a surface of an optical disc;
   (B) determining a value of said center error signal when said lens in said sled housing is at a mechanical center by measuring an average value of said center error signal over a predetermined amount of time when a lens suspension which holds said lens in place is in a mechanical equilibrium state;
   (C) generating an offset signal based upon said value; and
   (D) adjusting said lens in said sled housing at said mechanical center in response to said offset signal when in a rough seek mode.

12. The method according to claim 11, further comprising the steps of:
   determining whether said sled housing has completed stepping to a target sled position; and
   outputting a step motor control signal when said sled housing has not completed stepping to said target sled position.

13. The method according to claim 12, further comprising the steps of:
   determining whether one or more tracks of said optical disc and said lens have slowed down relative to each other; and
   activating a track controller when said tracks and said lens have slowed down relative to each other.

14. The method according to claim 13, further comprising the steps of:
   determining whether said main laser is locked to said one or more tracks of said optical disc; and
   completing said rough seek mode when said main laser is locked to said one or more tracks.

15. The method according to claim 14, further comprising the step of:
   determining whether said one or more tracks and said lens have slowed down relative to each other when said laser beam is not locked to said one or more tracks of said optical disc.

16. The method according to claim 11, further comprising switching control of said lens from a center error controller to a track controller when said sled housing reaches a target sled position.

17. The method according to claim 11, wherein said main laser is unlocked from said optical disc during said rough seek mode.

18. The method according to claim 11, further comprising the step of switching control of said lens from the center error signal to a tracking error signal at an end of the rough seek mode.

19. The method according to claim 11, further comprising the steps of:
   generating one or more photo-diode signals in response to the light from said main laser reflected from said surface of said optical disc; and
   generating said center error signal in response to said one or more photo-diode signals.

20. The method according to claim 11, wherein said lens suspension comprises one or more springs.

* * * * *